(12) United States Patent
Dudar (10) Patent No.: US 11,852,085 B2
(45) Date of Patent: Dec. 26, 2023

(54) METHODS AND SYSTEM FOR OVERCOMING A DEGRADED BAROMETRIC PRESSURE SENSOR

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/574,072

(22) Filed: Jan. 12, 2022

(65) Prior Publication Data
US 2023/0220806 A1    Jul. 13, 2023

(51) Int. Cl.
| | |
|---|---|
| F02D 35/00 | (2006.01) |
| F02D 41/02 | (2006.01) |
| G01C 5/06 | (2006.01) |
| G01N 15/08 | (2006.01) |
| F02D 41/40 | (2006.01) |
| G01C 25/00 | (2006.01) |

(52) U.S. Cl.
CPC ..... *F02D 35/0015* (2013.01); *F02D 35/0046* (2013.01); *F02D 41/0235* (2013.01); *F02D 41/401* (2013.01); *G01C 5/06* (2013.01); *G01C 25/00* (2013.01); *G01N 15/0806* (2013.01); *G01N 2015/084* (2013.01)

(58) Field of Classification Search
CPC ............. F02D 35/0015; F02D 41/0235; F02D 35/0046
See application file for complete search history.

(56) References Cited

U.S. PATENT DOCUMENTS

| | | | |
|---|---|---|---|
| 7,953,530 B1 | 5/2011 | Pederson et al. | |
| 8,205,601 B2* | 6/2012 | Coppola | F02D 41/062 60/601 |
| 8,479,495 B2* | 7/2013 | Funk | F02D 41/405 60/286 |
| 9,890,721 B2 | 2/2018 | Dudar | |
| 2011/0146233 A1* | 6/2011 | Carlill | F01N 3/023 60/285 |
| 2017/0072795 A1 | 3/2017 | Ghannam et al. | |
| 2017/0298811 A1* | 10/2017 | Santillo | F02B 37/12 |
| 2018/0058391 A1* | 3/2018 | Gibson | F02D 41/0077 |

* cited by examiner

*Primary Examiner* — Long T Tran
(74) *Attorney, Agent, or Firm* — Vincent Mastrogiacomo; McCoy Russell LLP (57) ABSTRACT

Systems and methods for operating an engine that includes an exhaust system with a differential pressure sensor are described. In one example, output of the differential pressure sensor is compared to output of a barometric pressure sensor to determine whether or not the barometric pressure sensor is degraded. The output of the differential pressure sensor may be monitored while the engine is rotated without being fueled.

12 Claims, 4 Drawing Sheets

METHODS AND SYSTEM FOR OVERCOMING A DEGRADED BAROMETRIC PRESSURE SENSOR

FIELD

The present description relates to methods and a system for assessing a state of a barometric pressure sensor.

BACKGROUND AND SUMMARY

A vehicle may include a barometric pressure sensor. The barometric pressure sensor may output a voltage, an electric current, or value that represents barometric pressure near an operating engine. The barometric pressure output may be applied to adjust a fuel injection amount, cam timing, and other engine actuators to compensate for changes in barometric pressure and altitude. However, it may be possible for output of a barometric pressure sensor to become degraded. For example, output of a barometric pressure sensor may be pulled toward ground level or to a level of a voltage source via a broken wire or a short circuit. If a barometric pressure value that is output via the barometric pressure sensor is degraded, the engine may operate with hesitation and engine emissions may degrade. Therefore, it may be desirable to determine whether or not output of a barometric pressure sensor is degraded.

The inventor herein has recognized the above-mentioned issues and has developed a method for operating an engine, comprising: via a controller, adjusting operation of the engine in response to a comparison of output of a barometric pressure sensor to output of a differential pressure sensor.

By comparing output of a barometric pressure sensor to output of a differential pressure sensor, it may be possible to provide the technical result of determining whether or not a barometric pressure sensor is degraded. In particular, if the engine does not have a manifold absolute pressure (MAP) sensor or an EGR sensor, output of a barometric sensor may be compared to output of a differential pressure sensor that is located in the engine's exhaust system to determine whether or not the barometric pressure sensor is degraded. If degradation of the barometric pressure is determined, barometric pressure may be determined from an alternative source so that engine operation may be improved.

The present description may provide several advantages. In particular, operation of a barometric pressure sensor may be evaluated even if the engine does not include a MAP sensor or an EGR sensor. Further, the approach may be performed in a non-intrusive way. In addition, approach may improve engine operation and reduce engine emissions.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
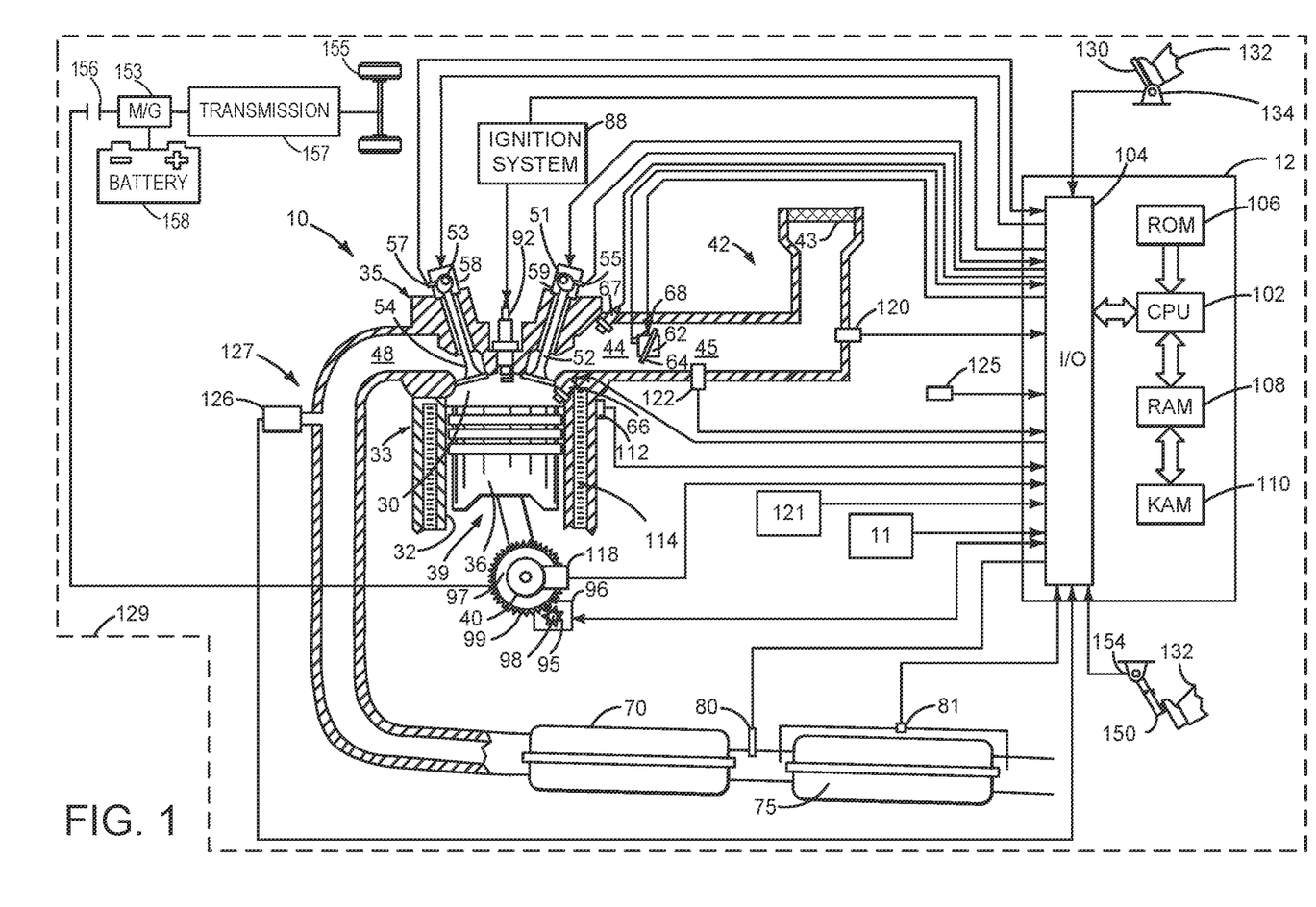
FIG. 1 is a schematic diagram of a vehicle that includes an engine.
Figure 2A:
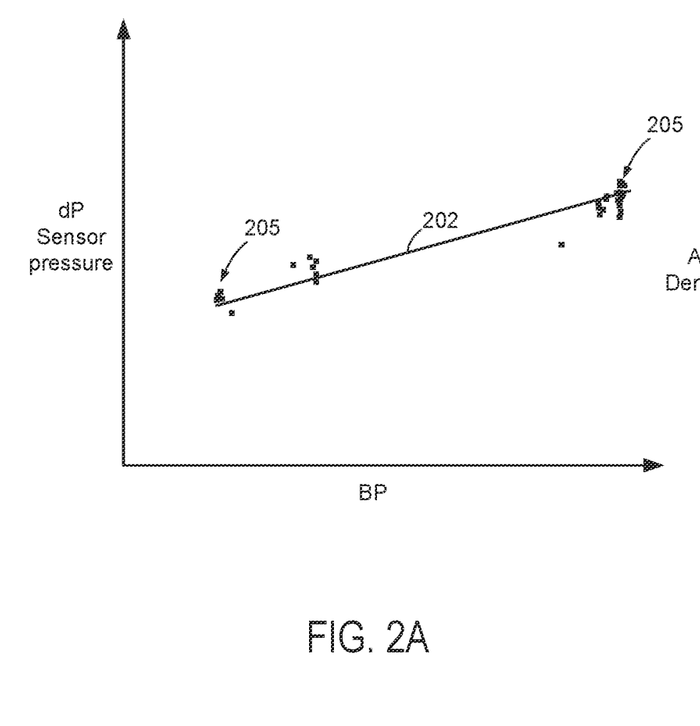
FIG. 2A is a plot that shows a relationship between barometric pressure and output of a differential pressure sensor.
Figure 2B:
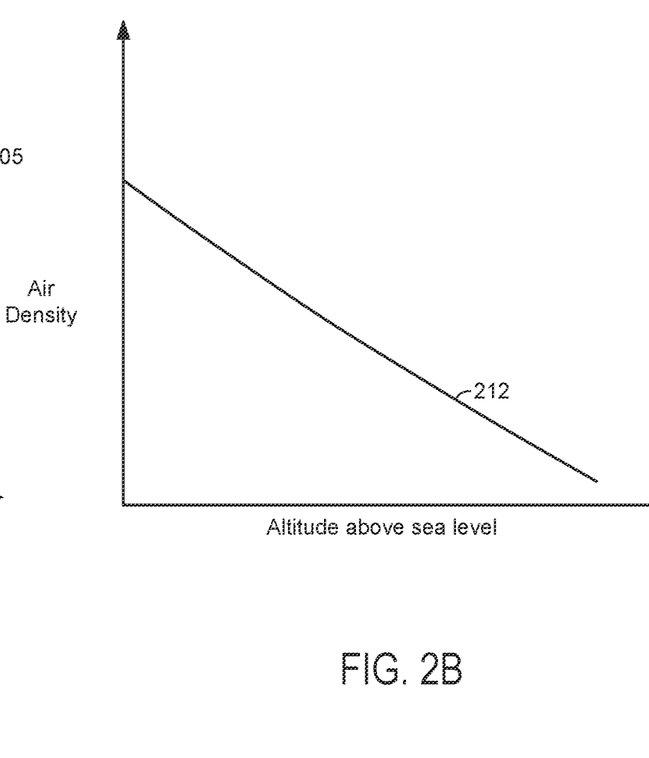
FIG. 2B is a plot that shows how air density may be affected by altitude.
Figure 3:
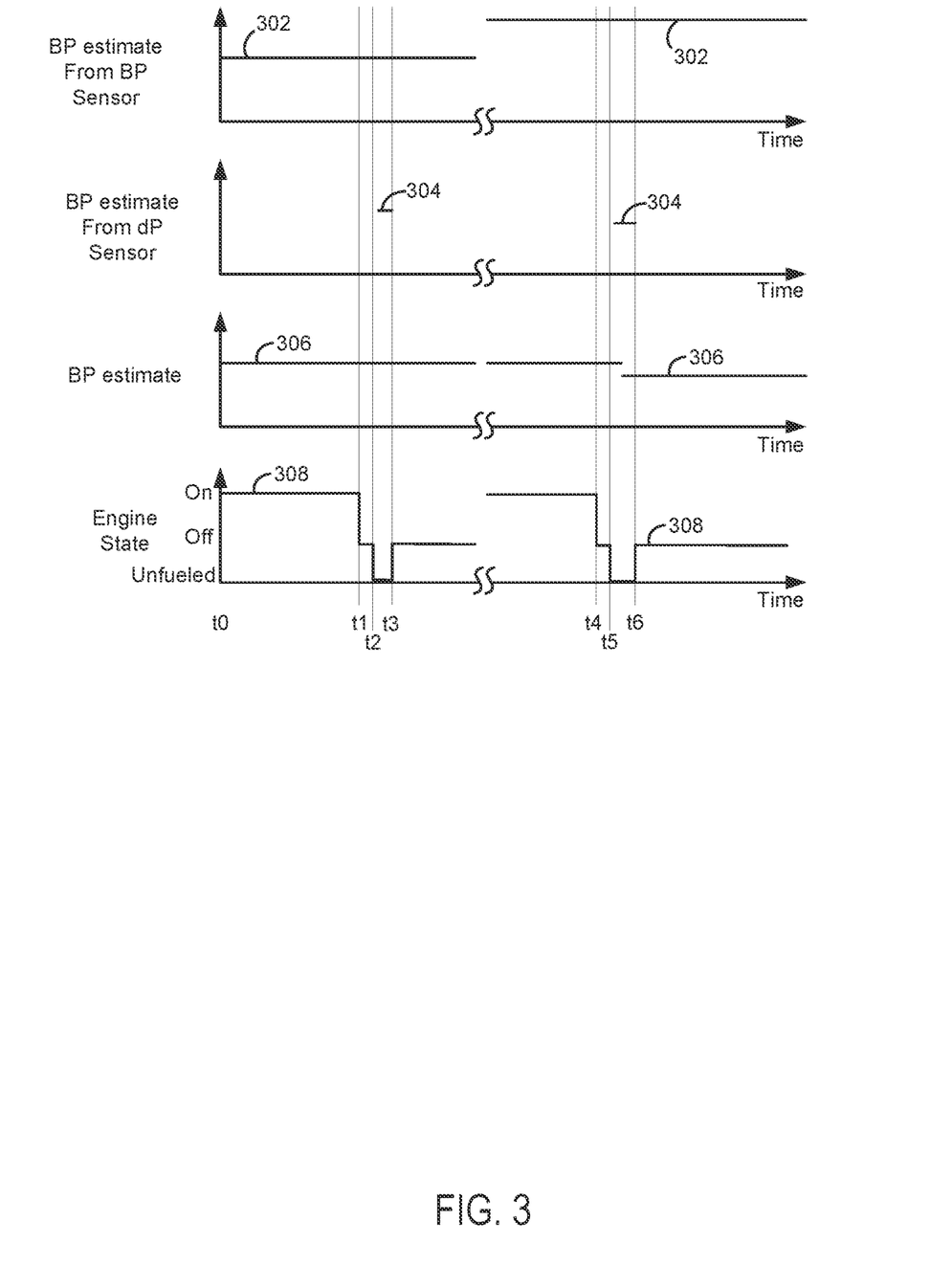
FIG. 3 shows example sequence for evaluating operation of a barometric pressure sensor.

The present description is related to evaluating operation of a barometric pressure sensor. The barometric pressure sensor may provide input for adjusting operation of an engine of the type that is shown in FIG. 1. Output of a differential pressure sensor may be related to barometric pressure as shown in FIG. 2A. Output of the differential pressure sensor may be influenced by altitude at which an engine is operated according to the relationship that is shown in FIG. 2B. A barometric pressure sensor may be evaluated as shown in the sequence of FIG. 3. An engine may be operated according to the method of FIG. 4

Referring to FIG. 1, vehicle 129 is shown. Vehicle 129 may be a conventional vehicle that may be propelled solely via engine 10 (e.g., an internal combustion engine). Alternatively, vehicle 129 may be a hybrid vehicle that may be propelled via engine 10 and/or electric machine 153. In the example shown, vehicle 129 includes engine 10 and an electric machine 153. Electric machine 153 may be a motor or a motor/generator. Crankshaft 40 of engine 10 and electric machine 153 are connected via a transmission 157 to vehicle wheels 155. In the depicted example, a clutch 156 is provided between crankshaft 40 and electric machine 153. Electric machine 153 is shown directly coupled to transmission 157. Controller 12 may send a signal to an actuator of clutch 156 to engage or disengage the clutch, so as to connect or disconnect crankshaft 40 from electric machine 153 and the components connected thereto. In other examples, clutch 156 need not be included. Transmission 157 may be a gearbox, a planetary gear system, or another type of transmission. The powertrain may be configured in various manners including as a parallel, a series, or a series-parallel hybrid vehicle. Electric machine 153 may receive electrical power from a traction battery 158 to provide torque to vehicle wheels 155. Electric machine 153 may also be operated as a generator to provide electrical power to charge battery 158, for example during a braking operation.

Engine 10 comprises a plurality of cylinders, one cylinder of which is shown in FIG. 1, is controlled by controller 12 (e.g., an electronic engine controller). The controller 12 receives signals from the various sensors shown in FIG. 1. The controller 12 employs the actuators shown in FIG. 1 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. For example, intake valve 52 may be held open or held closed for an entire cycle (e.g., two revolutions) of engine 10. Likewise, exhaust valve 54 may be held open or held closed for an entire cycle of engine 10. Valve activation devices 58 and 59 may be electro-mechanical devices.

Direct fuel injector 66 is shown positioned to inject fuel directly into cylinder 39, which is known to those skilled in the art as direct injection. Port fuel injector 67 is shown positioned to inject fuel into the intake port of cylinder 39, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

Optional electronic throttle 62 adjusts a position of throttle plate 64 to control air flow to intake manifold 44 from air intake 42. Air filter 43 may clean air entering air intake 42. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Combustion gases may exit engine 10 and enter exhaust system 127. Exhaust system 127 includes an exhaust manifold, a universal exhaust gas oxygen (UEGO) sensor 126, a three-way catalyst 70, a temperature sensor 80, a differential pressure sensor 81, and a carbonaceous soot trap 75. The exhaust sensor 126 is located upstream of three-way catalyst 70 according to a direction of exhaust gas flow. In some examples, a two-state exhaust gas oxygen sensor may be substituted for UEGO sensor 126. Three-way catalyst may include multiple bricks.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from engine position sensor 118 sensing crankshaft 40 position; a measurement of air mass entering the engine from sensor 120; a measurement of barometric pressure from barometric pressure sensor 125; and a measurement of throttle position from sensor 68. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device. In addition, controller 12 may exchange data with navigation system 121. For example, navigation system 121 may provide the vehicle's altitude and location to controller 12. Navigation system 121 may receive timing signals from global positioning satellites (GPS) (not shown).

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine; an exhaust system coupled to the engine, the exhaust system including a differential pressure sensor; a barometric pressure sensor; and a controller including executable instructions stored in non-transitory memory that cause the controller to compare an output from the barometric pressure sensor to an output from the differential pressure sensor, the output from the differential pressure sensor generated while the engine is rotated without being fueled. In a first example, the system may further comprise an electric machine and additional instructions to rotate the engine in response to a request to evaluate the barometric pressure sensor. In a second example that may include the first example, the system further comprises additional instructions to generate a barometric pressure value from the output of the differential pressure sensor. In a third example that may include one or more of the first and second examples, the system further comprises additional instructions to compensate the barometric pressure value for an altitude of a vehicle. In a fourth example that may include one or more of the first through third examples, the system further comprises additional instructions to indicate degradation of the barometric pressure sensor in response to a difference between a difference between a barometric pressure determined from the output of the barometric pressure sensor and a barometric pressure determined from the output of the differential pressure sensor. In a fifth example that may include one or more of the first through fourth examples, the system further comprises additional instructions to adjust operation of the engine in response to a difference between a difference between a barometric pressure determined from the output of the barometric pressure sensor and a barometric pressure determined from the output of the differential pressure sensor. In a sixth example that may include one or more of the first through fifth examples, the system includes where adjusting operation of the engine includes adjusting fuel injection timing.

Referring now to FIG. 2A, a plot of output of a differential pressure (dP) sensor versus barometric pressure (BP) is shown. The vertical axis represents differential pressure sensor output and the differential pressure sensor output increases in the direction of the vertical axis arrow. The output of the differential pressure sensor may be a voltage, electric current, or a differential pressure value. The horizontal axis represents barometric pressure and barometric pressure increases from the left side of the figure to the right side of the figure.

The output of the differential pressure sensor (e.g., 81) is taken when an engine is rotated without being fueled at a fixed speed for a range of barometric pressures. The engine pumps less air for a given engine speed at lower barometric pressures due to the density of air so there is a smaller differential pressure drop across the particulate filter. This relationship may be a basis for estimating barometric pressure. Because air flow through the engine changes as barometric pressure changes, and because a differential pressure across a particulate filter changes as flow through the particulate filter changes, differential pressure across the particulate filter may be indicative of barometric pressure.

Line 202 is a fit to differential pressure data points 205. Line 202 may be applied to describe the relationship between barometric pressure and output of the differential pressure sensor. For example, line 202 may be described via the equation y=mx+b where y is the differential pressure sensor output, b is an offset, m is the slope of line 201, and x is the barometric pressure. Thus, given output off the differential pressure and the equation of line 202, the barometric pressure may be determined. The slope may be determined via (y2−y1)/(x2−x1), where y2 is differential pressure sensor output at barometric pressure x2 and y1 is differential pressure sensor output at barometric pressure x1.

Referring now to FIG. 2B, a plot of air density versus altitude above sea level is shown. The vertical axis represents air density and the air density increases in the direction of the vertical axis arrow. The horizontal axis represents altitude above sea level and altitude above sea level increases from the left side of the figure to the right side of the figure.

Thus, it may be observed by line 212 that the density of air decreases with altitude. Consequently, the engine may pump less air at altitude than at sea level for a given engine speed. The engine air flow combined with the particulate filter in the exhaust system may cause a differential pressure to develop across the particulate filter. The differential pressure may be related to barometric pressure as shown in FIG. 2A.

Figure 4:
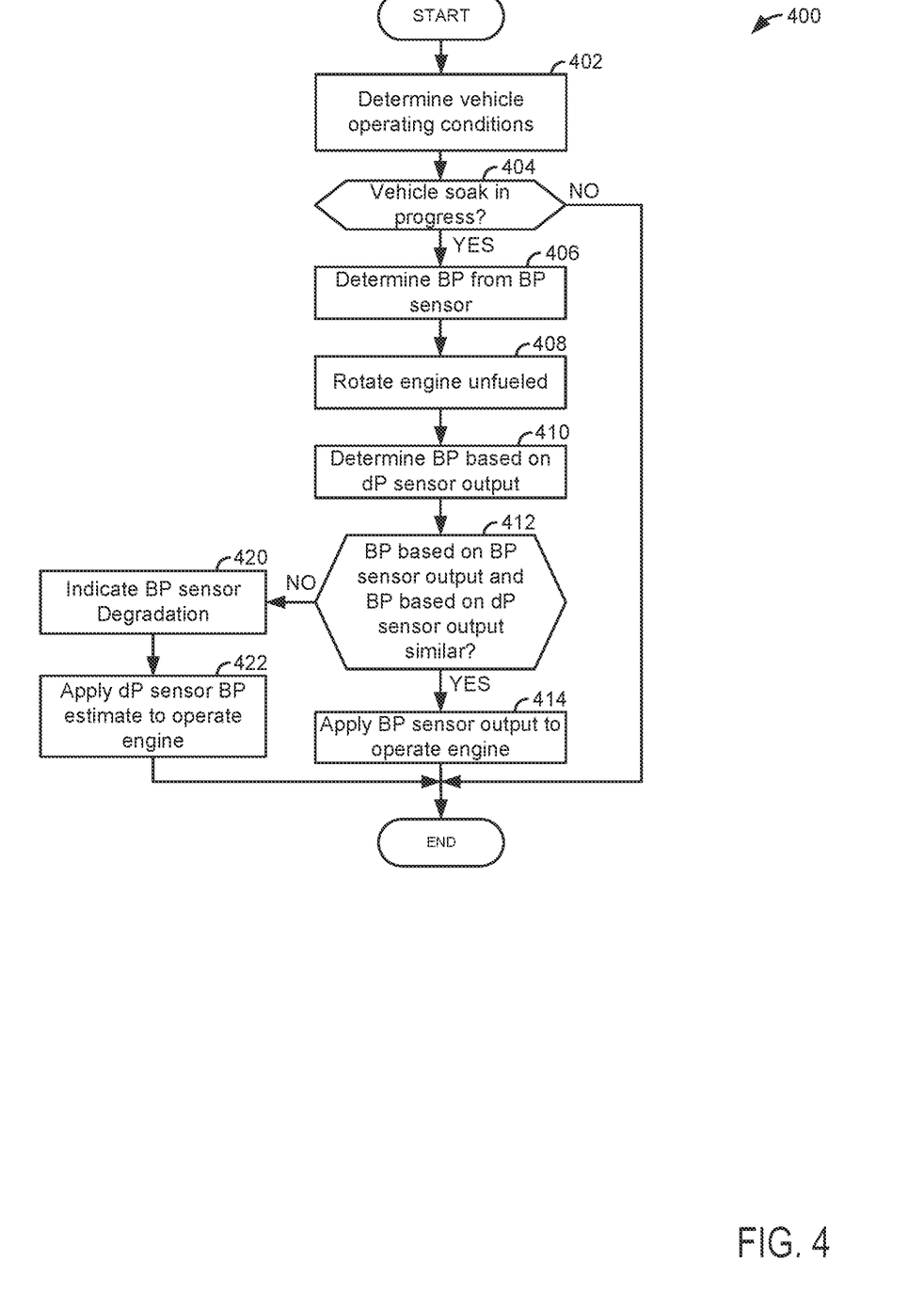
FIG. 4 shows a flowchart of a method for operating an engine.

Referring now to FIG. 3, an example vehicle operating sequence according to the method of FIG. 4 is shown. The operating sequence may be performed via the system of FIG. 1 in cooperation with the method of FIG. 4. Vertical lines at times t0-t6 represent times of interest during the sequence. The plots of FIG. 3 are time aligned. Breaks in the sequence are indicated by the SS marks along the horizontal axes.

The first plot from the top of FIG. 3 is a plot of an estimated barometric pressure as determined from output of a barometric pressure sensor versus time. The vertical axis represents the estimated barometric pressure and the estimated barometric pressure increases in the direction of the vertical axis arrow. The horizontal axis represents time and time increases from the left side of the plot to the right side of the plot.

The second from the top of FIG. 3 is a plot of an estimated barometric pressure as determined from output of a differential pressure sensor versus time. The vertical axis represents the estimated barometric pressure and the estimated barometric pressure increases in the direction of the vertical axis arrow. The horizontal axis represents time and time increases from the left side of the plot to the right side of the plot.

The third from the top of FIG. 3 is a plot of a barometric pressure estimate that is applied by the controller to operate the engine versus time. The vertical axis represents the barometric pressure that is applied by the controller and the barometric pressure that is applied by the controller increases in the direction of the vertical axis arrow. The horizontal axis represents time and time increases from the left side of the plot to the right side of the plot.

The fourth from the top of FIG. 3 is a plot of an engine operating state versus time. The vertical axis represents the engine operating state and the available engine operating states are listed along the vertical axis. The engine is in a particular operating state when line 308 aligns with a particular operating state along the vertical axis. The engine operating states include on (e.g., rotating and combusting fuel), Off (e.g., not rotating and not combusting fuel), and unfueled (e.g., rotating and not combusting fuel). The horizontal axis represents time and time increases from the left side of the figure to the right side of the figure. Trace 308 represents the engine operating state.

At time t0, the engine is operating and the barometric pressure estimate produced by the barometric pressure sensor is a middle level. A barometric pressure is not being estimated from the differential pressure sensor and the barometric pressure estimate that is applied by the controller to operate the engine is equal to the barometric pressure estimate that is produced by the barometric pressure sensor.

At time t1, the engine is stopped and barometric pressure estimate produced by the barometric pressure sensor is unchanged. A barometric pressure is not being estimated from the differential pressure sensor and the barometric pressure estimate that is applied by the controller to operate the engine is equal to the barometric pressure estimate that is produced by the barometric pressure sensor.

At time t2, a request to evaluate the barometric pressure sensor is generated (not shown) and the engine is rotated via an electric machine without supplying fuel to the engine. The engine pumps air resulting in a pressure drop across a particulate filter (not shown). The barometric pressure estimate produced by the barometric pressure sensor is unchanged and the barometric pressure estimate that is applied by the controller to operate the engine when the engine is operating is equal to the barometric pressure estimate that is produced by the barometric pressure sensor. Shortly after time t2, a barometric pressure estimate that is based on output of the differential pressure sensor is generated and it is substantially equal (e.g., within ±5%) to the barometric pressure estimate that is produced from the output of the barometric pressure sensor. Therefore, the barometric pressure sensor is determined to not be degraded. The barometric pressure estimate that is applied to operate the engine continues unchanged.

At time t3, the engine ceases rotating and the barometric pressure estimate that is applied to operate the engine remains equal to the barometric pressure estimate that is produced from the output of the barometric pressure sensor. The barometric pressure estimate from the barometric pressure sensor is unchanged. Barometric pressure is no longer estimated based on output of the differential pressure sensor.

There is a break in the sequence between time t3 and time t4. After the break in time and before time t4, the engine is rotating and combusting fuel. The barometric pressure estimate from the output of the barometric pressure sensor is high and the barometric pressure estimate that is applied to operate the engine is at a high level. Barometric pressure is not estimated from output of the differential pressure sensor.

At time t4, the engine is stopped and barometric pressure estimate produced by the barometric pressure sensor is unchanged. A barometric pressure is not being estimated from the differential pressure sensor and the barometric pressure estimate that is applied by the controller to operate the engine is equal to the barometric pressure estimate that is produced by the barometric pressure sensor.

At time t5, a request to evaluate the barometric pressure sensor is generated (not shown) and the engine is rotated via an electric machine without supplying fuel to the engine. The engine pumps air resulting in a pressure drop across a particulate filter (not shown). The barometric pressure estimate produced by the barometric pressure sensor is unchanged and the barometric pressure estimate that is applied by the controller to operate the engine when the engine is operating is equal to the barometric pressure estimate that is produced by the barometric pressure sensor. Shortly after time t5, a barometric pressure estimate that is based on output of the differential pressure sensor is generated and it is substantially less than the barometric pressure estimate that is produced from the output of the barometric pressure sensor. Therefore, the barometric pressure sensor may be determined to be degraded. The barometric pressure estimate that is applied to operate the engine is switched to the barometric pressure estimate that is generated from the differential pressure sensor output.

At time t6, the engine ceases rotating and the barometric pressure estimate that is applied to operate the engine is equal to the barometric pressure estimate that is produced from the output of the differential pressure sensor. The barometric pressure estimate from the barometric pressure sensor is unchanged. The barometric pressure estimate that is applied to operate the engine is set to the barometric pressure output that was generated from output of the differential pressure sensor when the engine was rotated unfueled.

In this way, a barometric pressure sensor may be evaluated or diagnosed. Specifically, if a barometric pressure that is determined from output of the barometric pressure sensor is not within a threshold barometric pressure of a barometric pressure that is estimated from output of a differential pressure sensor, it may be determined that the barometric pressure sensor is degraded. Thus, an engine may be operated according to a barometric pressure that is determined from an output of a barometric pressure sensor or from a barometric pressure that is determined from output of a differential pressure sensor.

Referring now to FIG. 4, a flow chart of a method for operating an engine and evaluating a barometric pressure sensor is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to engine speed, engine operating state (e.g., off, on, rotated without being fueled), barometric pressure sensor output, differential pressure sensor output, ambient temperature, exhaust temperature, vehicle speed, engine temperature, engine load, and driver demand torque or power. Method 400 may determine one or more vehicle operating conditions from data that is received to a controller. Method 400 proceeds to 404.

At 404, method 400 judges if a vehicle soak is in progress. A vehicle soak may be in progress when the vehicle is not activated (e.g., the engine of the vehicle is stopped and not rotating). In addition, method 400 may also judge if other operating conditions are present. For example, method 400 may determine if a barometric pressure sensor reading is out of range or has not changed within a threshold amount of time. If a vehicle soak is in progress, the answer is yes and method 400 proceeds to 406. Otherwise, the answer is no and method 400 proceeds to exit. Alternatively, if method 400 judges that a vehicle soak is in progress and if output of the barometric pressure sensor has not changed with in a threshold amount of time or is out of range, then method 400 may proceed to 406.

At 406, method 400 estimates or determines barometric pressure from output of the barometric pressure sensor. The barometric pressure sensor may output a voltage, electric current, or a numeric barometric pressure value (e.g., a value of one or more digital words). In examples where the barometric pressure sensor outputs a voltage or current, the voltage or current may be sampled via an analog to digital converter. The digital converter outputs a number and the number may be converted to a barometric pressure via a function of the form BP=f(AD1), where f is a function that returns a barometric pressure value and AD1 is a numerical output of an analog to digital converter. Whether the barometric pressure sensor outputs a barometric pressure value or a voltage/current, the barometric pressure value is stored in controller memory (e.g., RAM). Method 400 proceeds to 408.

At 408, method 400 rotates the engine unfueled. The engine may be rotated via a conventional starter (e.g., 96 of FIG. 1) or via an electric machine (e.g., 153 of FIG. 1) that may provide torque to a hybrid vehicle driveline. The vehicle brakes may be applied and the vehicle's transmission may be engaged in park when the engine is rotated. In addition, method 408 may fully open the engine's throttle while the engine is rotating to maximize air flow through the engine. In some examples, cam timing may also be adjusted to improve air flow through the engine. Method 400 proceeds to 410.

At 410, method 400 estimates or determines barometric pressure from output of the differential pressure sensor (e.g.,

81 of FIG. 1). The differential pressure sensor may output a voltage, electric current, or a numeric barometric pressure value (e.g., a value of one or more digital words). In examples where the differential pressure sensor outputs a voltage or current, the voltage or current may be sampled via an analog to digital converter. The digital converter outputs a number and the number may be converted to a barometric pressure via a function of the form BP=g(AD1,alt), where g is a function that returns a barometric pressure value and AD1 is a numerical output of an analog to digital converter and alt is the vehicle's present altitude. The function g may estimate barometric pressure based on an equation of a line as mentioned in the description of FIG. 2, or alternatively, via interpolating between values stored in a table in controller memory. The table may be referenced via vehicle altitude and differential pressure sensor output. Thus, the barometric pressure value may be compensated according to the vehicle's present altitude. The vehicle's present altitude may be determined according to the vehicle's present position and maps stored in the vehicle's navigation system. The vehicle's present position may be determined via the vehicle's navigation system and time stamp data delivered via global positioning satellites. The barometric pressure value that is determined through output of the differential pressure sensor is stored in controller memory (e.g., RAM). Method 400 proceeds to 412.

At 412, method 400 judges if the barometric pressure that was determined from output of the barometric pressure sensor at 406 is within a threshold barometric pressure of the barometric pressure that was determined from output of the differential pressure sensor at 410. For example, if the barometric pressure value that was determined from output of the barometric pressure sensor is within ±5% of the barometric pressure value that was determined from output of the differential pressure sensor, the answer is yes. If method 400 judges that the barometric pressure that was determined from output of the barometric pressure sensor at 406 is within a threshold barometric pressure of the barometric pressure that was determined from output of the differential pressure sensor at 410, the answer is yes and method 400 proceeds to 414. Otherwise, the answer is no and method 400 proceeds to 420.

At 414, method 400 applies the barometric pressure that was determined based on output of the barometric pressure sensor at 406 to operate the engine. In one example, the barometric pressure is applied to adjust fuel injection timing and to modify an engine air flow amount. The modified engine air flow amount may influence the amount of fuel that is injected to the engine. Method 400 proceeds to exit.

At 420, method 400 provides an indication of barometric pressure sensor degradation. In one example, method 400 may display a message to a human/machine interface to indicate barometric sensor degradation. Method 400 proceeds to 422.

In this way, output of a barometric pressure sensor may be a basis for adjusting engine operation when the barometric pressure sensor is not determined to be degraded. However, if the barometric pressure sensor is determined to be degraded, a barometric pressure determined from output of a differential pressure sensor while an engine rotated without being fueled may be applied to operate the engine and output of the barometric pressure sensor may be ignored.

The method of FIG. 4 provides for a method for operating an engine, comprising: via a controller, adjusting operation of the engine in response to a comparison of output of a barometric pressure sensor to output of a differential pressure sensor. In a first example, the method includes where the differential pressure sensor is configured to monitor a pressure difference across a particulate filter. In a second example that may include the first example, the method further comprises estimating a barometric pressure based on output of the differential pressure sensor. In a third example that may include one or more of the first example and the second example, the method includes where adjusting operation of the engine includes adjusting operation of the engine according to the barometric pressure based on output of the differential pressure sensor. In a fourth example that may include one or more of the first through third examples, the method includes where adjusting operation of the engine includes adjusting an amount of fuel injected. In a fifth example that may include one or more of the first through fourth examples, the method further comprises providing an indication of degradation of the barometric pressure sensor in response to the comparison. In a sixth example that may include one or more of the first through fifth examples, the method further comprises converting the output of the barometric pressure sensor to a first barometric pressure estimate and converting the output of the differential pressure sensor to a second barometric pressure estimate. In a seventh example that may include one or more of the first through sixth examples, the method further comprises providing an indication of degradation of the barometric pressure sensor in response to a comparison between the first barometric pressure and the second barometric pressure.

The method of FIG. 4 also provides for a method for operating an engine, comprising: via a controller, rotating an engine via an electric machine and estimating a barometric pressure from an output of a differential pressure sensor, the output of the differential pressure sensor generated while rotating the engine via the electric machine, and where the engine is rotated via the electric machine while fuel is not injected to the engine. In a first example, the method further comprises indicating degradation of a barometric pressure sensor in response to the estimated barometric pressure. In a second example that may include the first example, the method further comprises adjusting engine operation in response to the barometric pressure. In a third example that may include one or more of the first and second examples, the method includes where the engine is rotated in response to a request to evaluate a barometric pressure sensor. In a fourth example that may include one or more of the first through third examples, the method further comprises comparing the output of the differential pressure sensor to output of the barometric pressure sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A system, comprising:
an engine;
an exhaust system coupled to the engine, the exhaust system including a differential pressure sensor;
a barometric pressure sensor; and
a controller including executable instructions stored in non-transitory memory that cause the controller to compare an output from the barometric pressure sensor to an output from the differential pressure sensor, the output from the differential pressure sensor generated while the engine is rotated without being fueled.

2. The system of claim 1, further comprising an electric machine and additional instructions to rotate the engine in response to a request to evaluate the barometric pressure sensor.

3. The system of claim 1, further comprising additional instructions to generate a barometric pressure value from the output of the differential pressure sensor.

4. The system of claim 3, further comprising additional instructions to compensate the barometric pressure value for an altitude of a vehicle.

5. The system of claim 1, further comprising additional instructions to indicate degradation of the barometric pressure sensor in response to a difference between a first barometric pressure determined from the output of the barometric pressure sensor and a second barometric pressure determined from the output of the differential pressure sensor.

6. The system of claim 5, further comprising additional instructions to adjust operation of the engine in response to the difference between the first barometric pressure determined from the output of the barometric pressure sensor and the second barometric pressure determined from the output of the differential pressure sensor.

7. The system of claim 6, where adjusting operation of the engine includes adjusting fuel injection timing.

8. A method for operating an engine, comprising:
via a controller, rotating the engine via an electric machine and estimating a barometric pressure from an output of a differential pressure sensor, the output of the differential pressure sensor generated while rotating the engine via the electric machine, and where the engine is rotated via the electric machine while fuel is not injected to the engine.

9. The method of claim 8, further comprising indicating degradation of a barometric pressure sensor in response to the barometric pressure.

10. The method of claim 8, further comprising adjusting engine operation in response to the barometric pressure.

11. The method of claim 8, where the engine is rotated in response to a request to evaluate a barometric pressure sensor.

12. The method of claim 11, further comprising comparing the output of the differential pressure sensor to output of the barometric pressure sensor.

* * * * *